United States Patent
Rataj et al.

(10) Patent No.: US 11,554,446 B2
(45) Date of Patent: Jan. 17, 2023

(54) BEAM SHAPER AND USE THEREOF, DEVICE FOR LASER BEAM TREATMENT OF A WORKPIECE AND USE THEREOF, METHOD FOR LASER BEAM TREATMENT OF A WORKPIECE

(71) Applicant: Bystronic Laser AG, Niederoenz (CH)

(72) Inventors: Thomas Rataj, Oberoenz (CH); Stefan Wittwer, Herzogenbuchsee (CH); Simon Scheidiger, Langenthal (CH)

(73) Assignee: BYSTRONIC LASER AG, Niederoenz (CH)

( * ) Notice: Subject to any disclaimer, the term of this patent is extended or adjusted under 35 U.S.C. 154(b) by 0 days.

(21) Appl. No.: 16/620,842

(22) PCT Filed: Jun. 4, 2018

(86) PCT No.: PCT/EP2018/064574
§ 371 (c)(1),
(2) Date: Dec. 9, 2019

(87) PCT Pub. No.: WO2018/224422
PCT Pub. Date: Dec. 13, 2018

(65) Prior Publication Data
US 2020/0156189 A1    May 21, 2020

(30) Foreign Application Priority Data
Jun. 9, 2017  (EP) ..................... 17175354

(51) Int. Cl.
*B23K 26/06* (2014.01)
*B23K 26/38* (2014.01)
(Continued)

(52) U.S. Cl.
CPC ............ *B23K 26/38* (2013.01); *B23K 26/066* (2015.10); *B23K 26/0648* (2013.01);
(Continued)

(58) Field of Classification Search
CPC .. B23K 26/38; B23K 26/066; B23K 26/0648; B23K 26/0652; B23K 26/0665; G02B 5/001; G02B 27/0955
(Continued)

(56) References Cited

U.S. PATENT DOCUMENTS

| 3,419,321 A | * | 12/1968 | Barber | ............... B23K 26/0734 219/121.7 |
| 4,275,288 A | * | 6/1981 | Makosch | ............. B23K 26/073 219/121.63 |

(Continued)

FOREIGN PATENT DOCUMENTS

| EP | 2730363 | 5/2014 |
| JP | 2002196246 | 7/2002 |

OTHER PUBLICATIONS

High quality quasi-Bessel beam generated by round-tip axicon. [online]. Retrieved from the Internet: <URL: https://www.semanticscholar.org/paper/High-quality-quasi-Bessel-beam-generated-by-axicon.-Brzobohat%C3%BD-%C4%8Ci%C5%BEm%C3%A1r/eb24c437b21e07d599a501cda0b0b>. (Year: 2008).*

(Continued)

*Primary Examiner* — Jimmy Chou
(74) *Attorney, Agent, or Firm* — Workman Nydegger

(57) ABSTRACT

A beam shaper (1) for shaping a laser beam is provided, including a first beam shaping section (2) designed for shaping a central part of the laser beam, and a second beam shaping section (3) designed for shaping a peripheral part of the laser beam. Moreover, a device for laser beam treatment of a workpiece and a method for laser beam treatment of a workpiece are provided.

16 Claims, 9 Drawing Sheets

Figure 2:
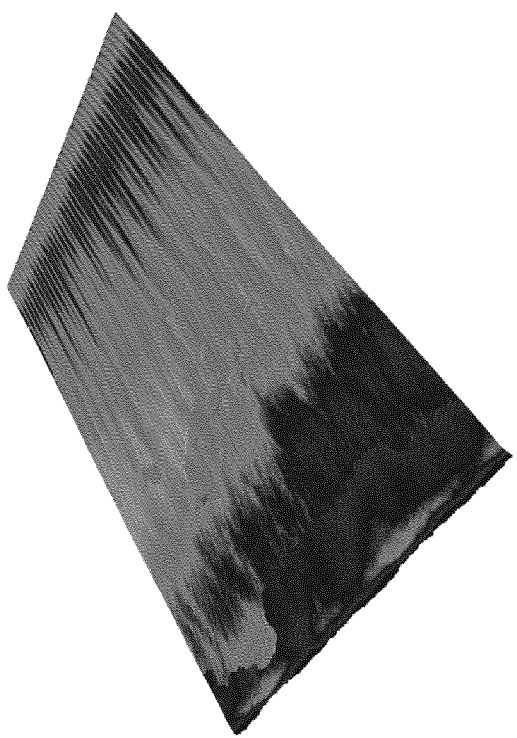

(51) Int. Cl.
*B23K 26/066* (2014.01)
*G02B 5/00* (2006.01)
*G02B 27/09* (2006.01)

(52) U.S. Cl.
CPC ...... *B23K 26/0652* (2013.01); *B23K 26/0665* (2013.01); *G02B 5/001* (2013.01); *G02B 27/0955* (2013.01)

(58) Field of Classification Search
USPC ...... 372/93, 94, 97, 98, 99, 103; 219/121.72
See application file for complete search history.

(56) References Cited

U.S. PATENT DOCUMENTS

| | | | | | |
|---|---|---|---|---|---|
| 4,356,375 | A | * | 10/1982 | Josephy | B23K 26/0738 219/121.68 |
| 4,630,274 | A | * | 12/1986 | Schafer | H05G 2/008 372/5 |
| 4,636,611 | A | * | 1/1987 | Penney | B23K 26/0734 219/124.34 |
| 4,642,439 | A | * | 2/1987 | Miller | B23K 26/0734 219/121.72 |
| 4,649,351 | A | * | 3/1987 | Veldkamp | H01S 3/08009 372/18 |
| 4,842,393 | A | * | 6/1989 | Gorman | G02B 5/001 359/708 |
| 4,997,250 | A | * | 3/1991 | Ortiz, Jr. | B23K 26/06 219/121.75 |
| 5,245,619 | A | * | 9/1993 | Kronberg | G02B 27/09 359/559 |
| 5,256,853 | A | * | 10/1993 | McIntyre | B23K 26/0734 219/121.68 |
| 5,402,438 | A | * | 3/1995 | Tanuma | G02B 6/4206 372/101 |
| 5,475,197 | A | * | 12/1995 | Wrobel | A61F 9/00804 219/121.61 |
| 5,761,224 | A | * | 6/1998 | Mathieu | H01S 3/305 372/3 |
| 5,774,491 | A | * | 6/1998 | Kimura | G21K 1/003 372/103 |
| 6,016,223 | A | * | 1/2000 | Suzuki | G02B 27/09 359/558 |
| 6,137,820 | A | * | 10/2000 | Maag | H01S 3/09415 372/106 |
| 6,600,767 | B1 | * | 7/2003 | Lefevre | H01S 3/1055 372/107 |
| 6,633,433 | B2 | * | 10/2003 | Bergstein | G06K 7/10702 235/454 |
| 8,035,901 | B2 | * | 10/2011 | Abramov | B23K 26/0734 359/709 |
| 8,154,978 | B2 | * | 4/2012 | Hotta | G11B 7/1374 369/112.23 |
| 8,576,479 | B2 | * | 11/2013 | Dam | G02B 5/1876 359/326 |
| 9,477,074 | B2 | * | 10/2016 | Betzig | G02B 21/0004 |
| 9,873,628 | B1 | * | 1/2018 | Haloui | B23K 26/53 |
| 10,247,672 | B2 | * | 4/2019 | Betzig | G01N 21/6428 |
| 2002/0167581 | A1 | * | 11/2002 | Cordingley | B23K 26/10 257/E23.15 |
| 2005/0205778 | A1 | * | 9/2005 | Kitai | B23K 26/364 250/309 |
| 2007/0051706 | A1 | * | 3/2007 | Bovatsek | B23K 26/0624 219/121.69 |
| 2007/0183036 | A1 | * | 8/2007 | Lipson | G02B 27/286 359/485.02 |
| 2009/0272149 | A1 | * | 11/2009 | Abramov | B23K 26/40 65/111 |
| 2010/0120113 | A1 | * | 5/2010 | Mohanty | G02B 6/262 435/173.1 |
| 2010/0142049 | A1 | * | 6/2010 | Sawabe | G02B 5/001 359/485.01 |
| 2010/0177253 | A1 | * | 7/2010 | Golub | H04N 9/3161 349/8 |
| 2010/0320177 | A1 | * | 12/2010 | Ramsayer | B23K 26/0648 219/121.67 |
| 2011/0182308 | A1 | * | 7/2011 | Ullman | H01S 3/0602 372/35 |
| 2012/0031883 | A1 | * | 2/2012 | Kumamoto | B23K 26/38 219/121.78 |
| 2012/0076456 | A1 | * | 3/2012 | Kathman | G02B 6/34 385/33 |
| 2012/0170137 | A1 | * | 7/2012 | Palumbo | G02B 19/008 359/709 |
| 2013/0135613 | A1 | * | 5/2013 | Palumbo | G02B 26/0808 356/244 |
| 2013/0180966 | A1 | * | 7/2013 | Gross | B23K 26/083 219/121.69 |
| 2014/0131327 | A1 | * | 5/2014 | Nishitani | B23K 26/0853 219/121.63 |
| 2014/0199519 | A1 | * | 7/2014 | Schillinger | C03B 33/091 428/155 |
| 2014/0339207 | A1 | * | 11/2014 | Sugiyama | B23K 26/38 219/121.72 |
| 2015/0037877 | A1 | * | 2/2015 | Peng | G01N 21/6428 435/288.7 |
| 2015/0053656 | A1 | * | 2/2015 | Popp | B23K 10/00 219/121.44 |
| 2015/0151380 | A1 | * | 6/2015 | Hosseini | B23K 26/53 219/121.72 |
| 2015/0165562 | A1 | * | 6/2015 | Marjanovic | B23K 26/0613 428/64.1 |
| 2015/0234195 | A1 | * | 8/2015 | Honea | G02B 19/0023 359/618 |
| 2016/0004074 | A1 | * | 1/2016 | Zhang | G03F 7/70091 359/223.1 |
| 2016/0025914 | A1 | * | 1/2016 | Brongersma | G02B 5/001 359/489.07 |
| 2016/0052085 | A1 | * | 2/2016 | Kawaguchi | B23K 26/0648 219/121.68 |
| 2016/0052088 | A1 | * | 2/2016 | Kawaguchi | B23K 26/03 219/121.74 |
| 2016/0059350 | A1 | * | 3/2016 | Schoenleber | G01B 9/02091 219/121.81 |
| 2016/0089749 | A1 | * | 3/2016 | Mori | G02B 27/0025 219/121.75 |
| 2016/0167165 | A1 | * | 6/2016 | Roch | B23K 26/0608 219/121.75 |
| 2016/0223801 | A1 | * | 8/2016 | Kiontke | G02B 17/0808 |
| 2017/0052381 | A1 | * | 2/2017 | Huang | B23K 26/073 |
| 2017/0151630 | A1 | * | 6/2017 | Huang | B23K 26/0648 |
| 2018/0214981 | A1 | * | 8/2018 | Kaiser | B23K 26/0622 |
| 2018/0259779 | A1 | * | 9/2018 | Tamura | C03B 33/0222 |
| 2019/0026581 | A1 | * | 1/2019 | Leizerson | G06V 10/145 |

OTHER PUBLICATIONS

High quality quasi-Bessel beam generated by round-tip axicon. [Online]. Retrieved from the internet: <https://www.researchgate.net/publication/23178823_High_quality_quasi-Bessel_beam_generated_by_round-tip_axicon>. (Year: 2008).*

* cited by examiner

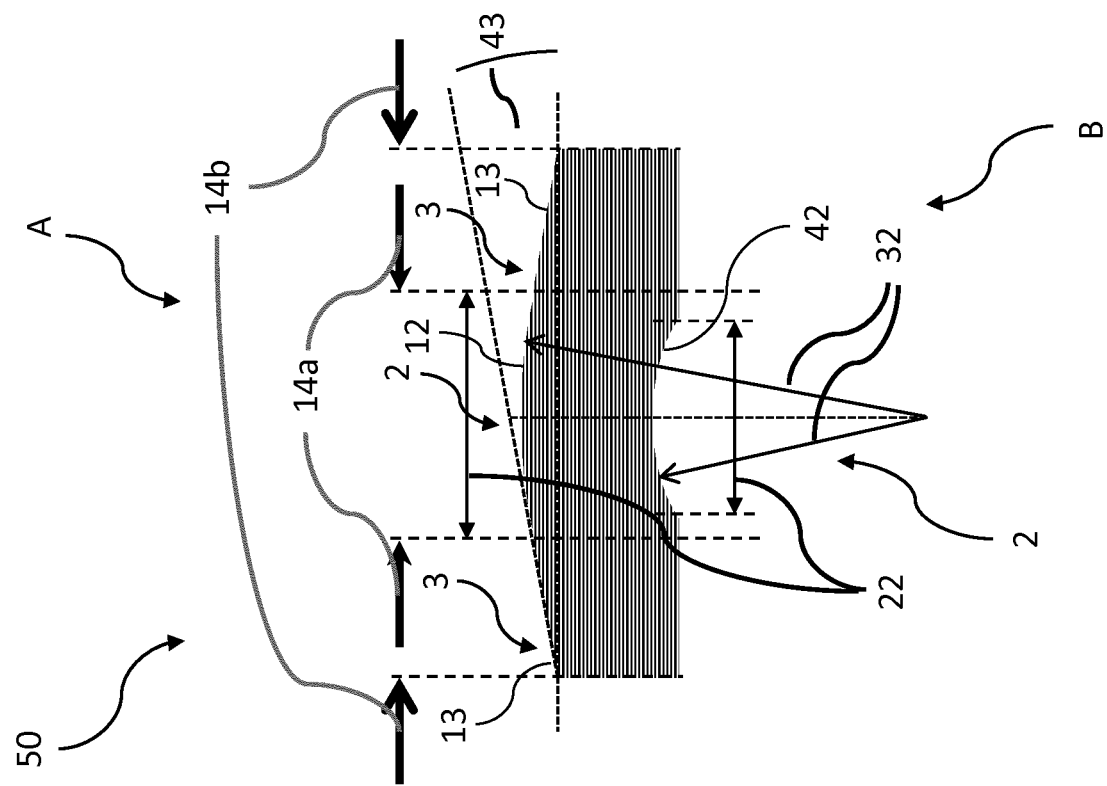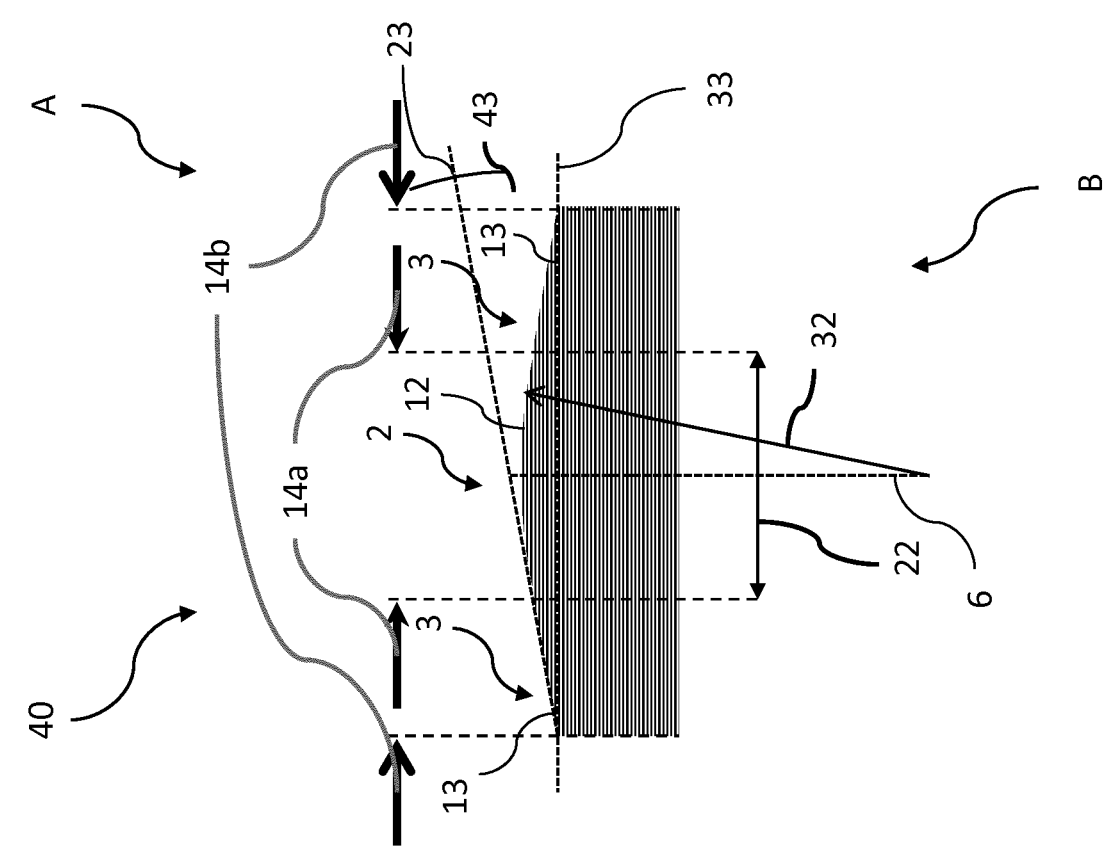
Fig. 4a
Fig. 4b

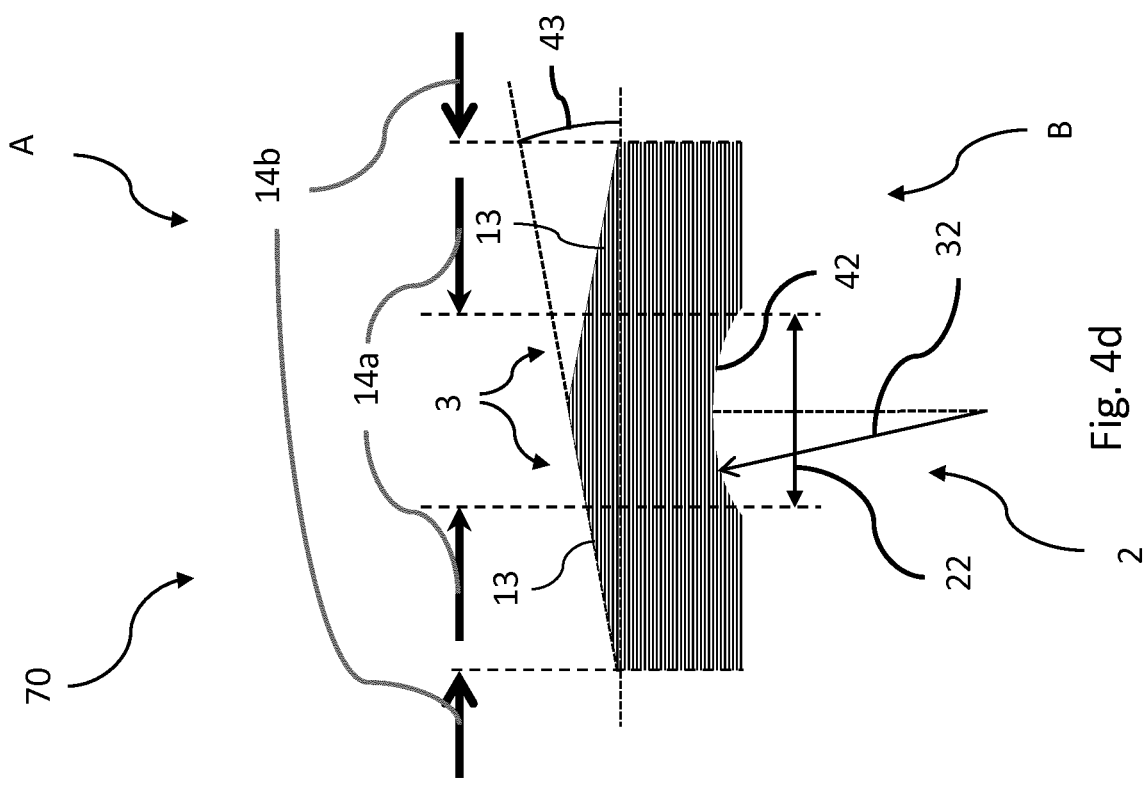
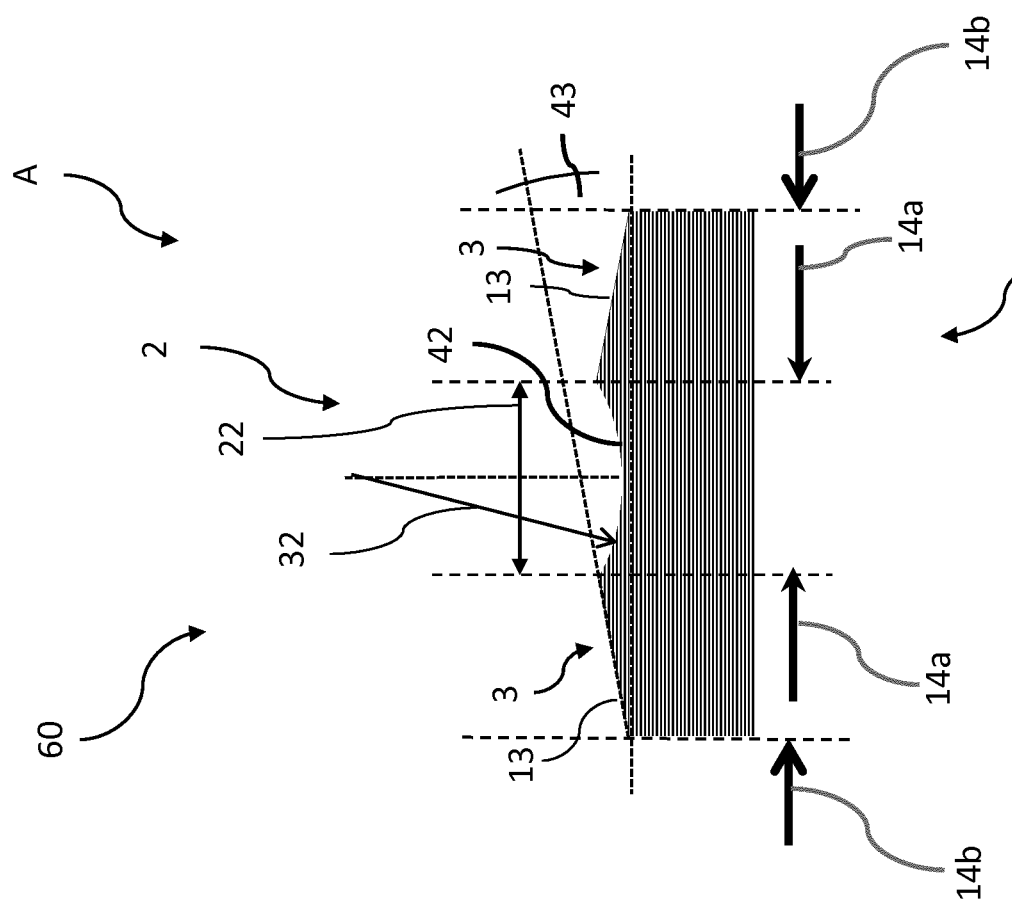
Fig. 4d
Fig. 4c

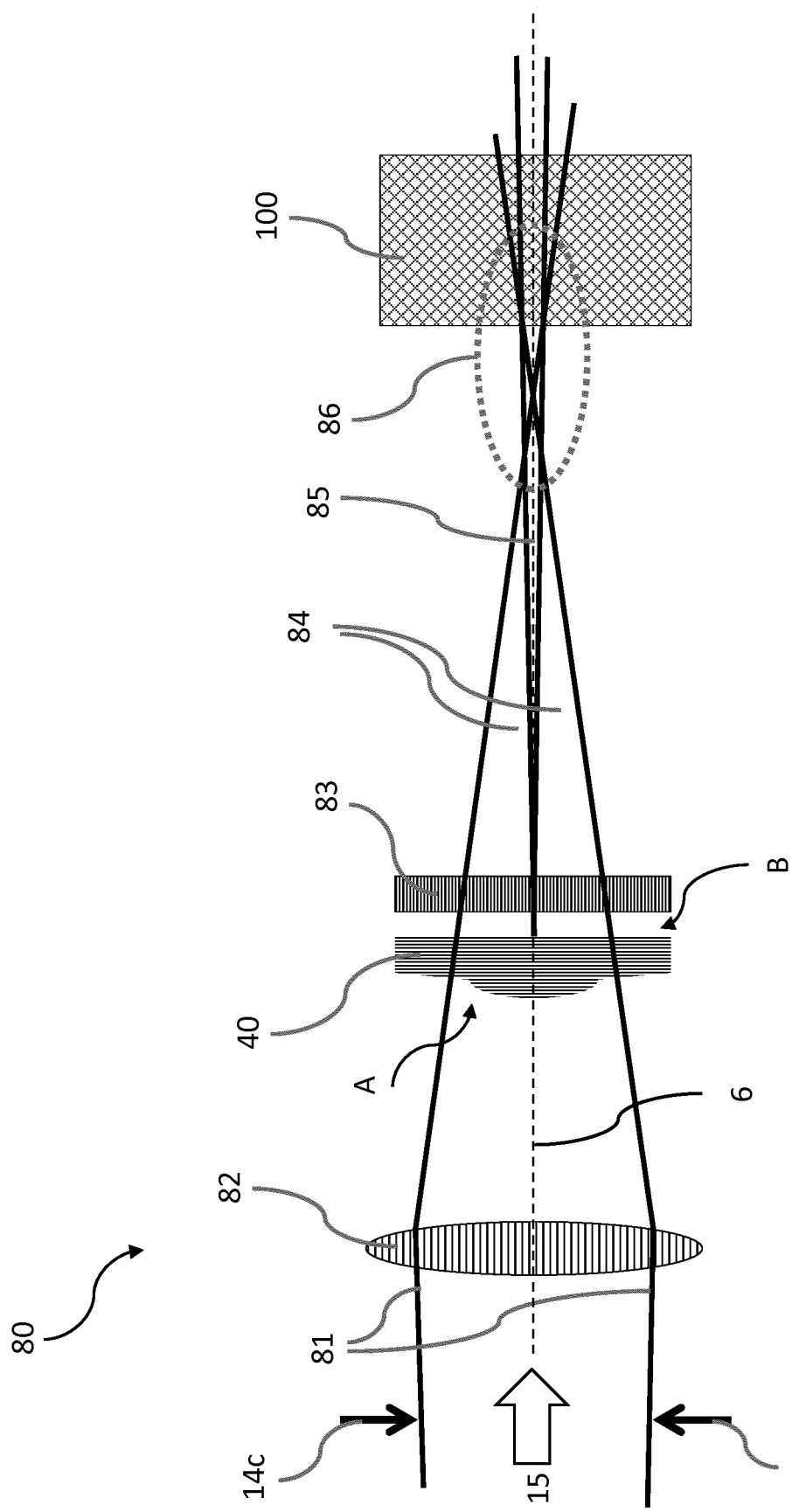

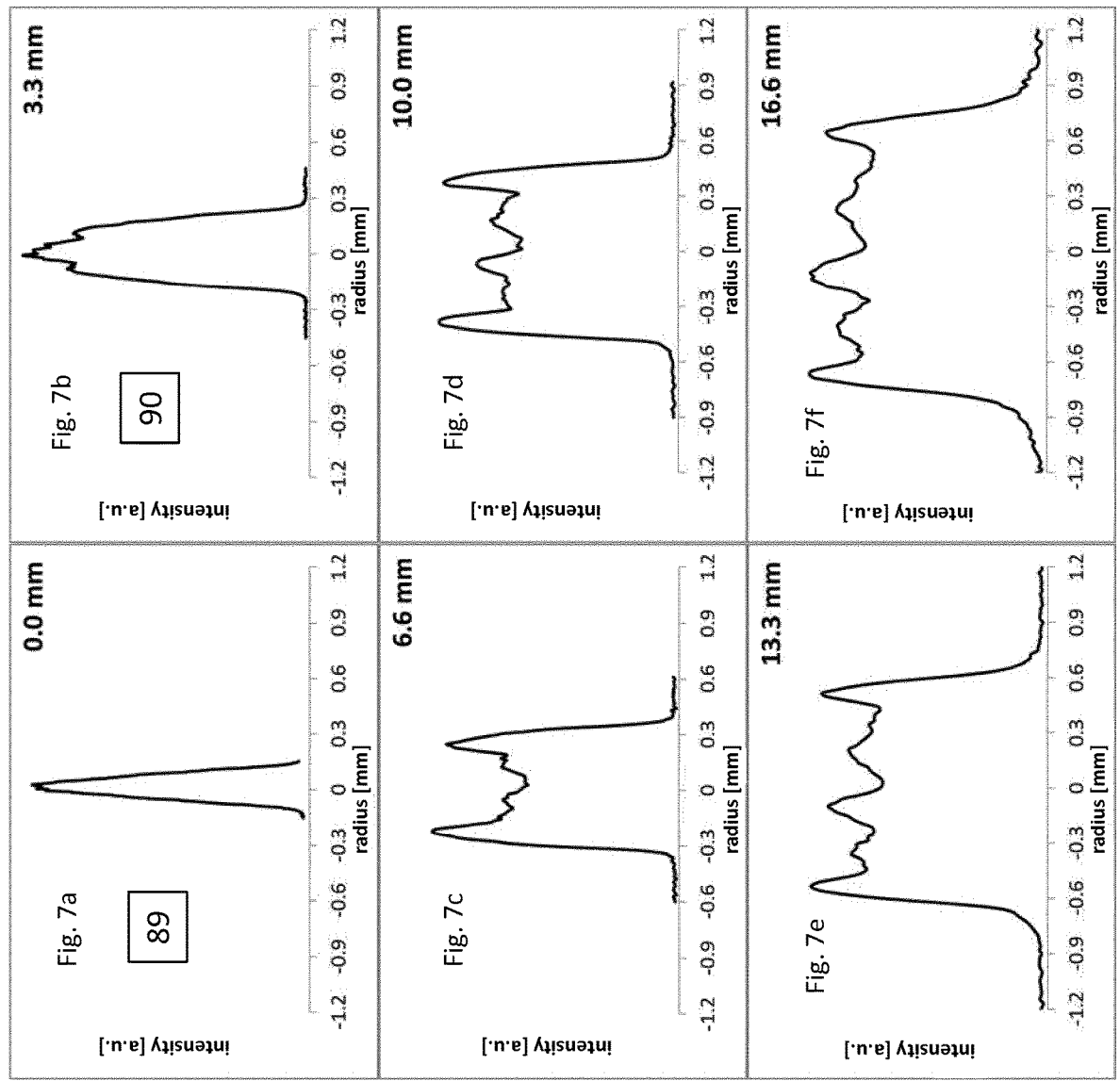

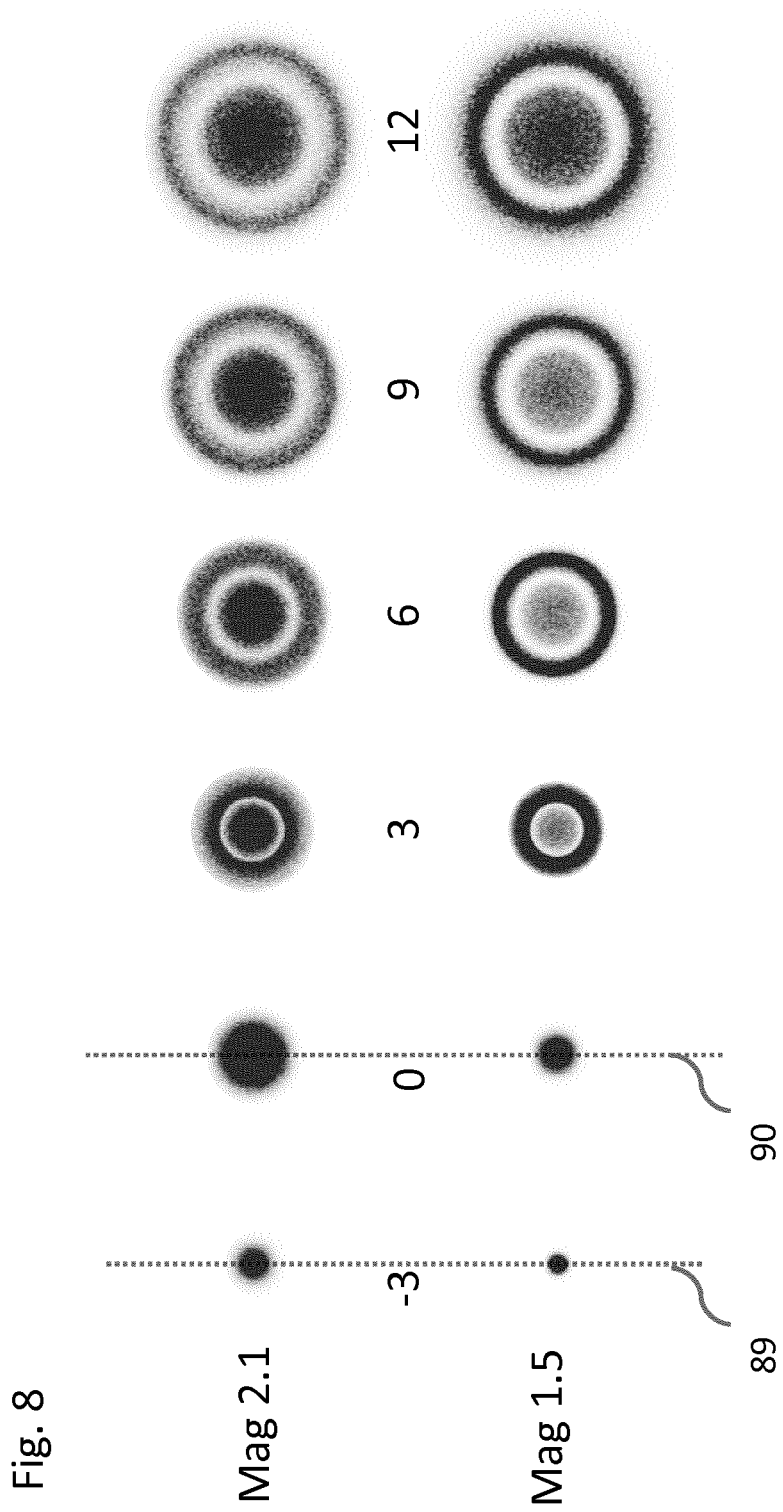

BEAM SHAPER AND USE THEREOF, DEVICE FOR LASER BEAM TREATMENT OF A WORKPIECE AND USE THEREOF, METHOD FOR LASER BEAM TREATMENT OF A WORKPIECE

The present invention is directed to a beam shaper and a use thereof, a device for laser beam treatment of a workpiece and a use thereof, and a method for laser beam treatment of a workpiece.

A main demand on treatment of metal sheets, such as cutting, using laser radiation is to improve the quality of the treated workpieces. For laser beam cutting an assist gas is typically used, which may be active or inert.

When cutting e.g. with oxygen as active gas, the metal is burned and vaporized after being heated up to ignition temperature by the laser beam. The reaction between the oxygen and the metal actually creates additional energy in the form of heat, which supports the cutting process. The molten liquid metal, which has very low viscosity, is removed from the cut by the shear force of the oxygen jet. When cutting with an inert gas, such as nitrogen, the material is molten solely by the laser power and blown out of the cut kerf by the kinetic energy of the gas jet.

Generally, and particularly in case of laser cutting relatively thick workpieces, the quality of the treated workpiece is dependent on system parameters. There are several factors which may have a negative impact onto the quality of the treated workpiece, such as: a low quality of the initial workpiece surface; undesired intense heating of the workpiece surface around the region of ignition, which may promote hot spots; high heat input into the melt, which may result in hot spots; turbulences within the flow of the molten material; and uncontrolled growth of the reaction front and of the melting front. Each of these factors may result in undesired pronounced surface corrugations of the treated or cut surface. In case of laser cutting of thick workpieces, each of these factors may result in formation of hot spots even at deeper levels of the cut surface. The formation of hot spots is not desired, since hot spots may promote turbulences within the molten material, thereby increasing the amplitude of surface corrugations.

For laser cutting sheets of e.g. mild steel a cutting process using oxygen gas has been established. However, cut surfaces of mild steel workpieces having thicknesses of 15 mm or more show corrugations even when laser treated by gas cutting. In addition, as the thickness of the workpiece increases, the cutting quality is more and more dependent on treatment parameters. According to a gas cutting method using a laser beam and shown in DE 4215561, a controlled combustion is performed after preheating the workpiece. There is a need for laser beam treatment of metal sheets having high thicknesses, e.g. more than 15 mm, by which the corrugation amplitudes of the cut surface can be reduced.

Figure 1:
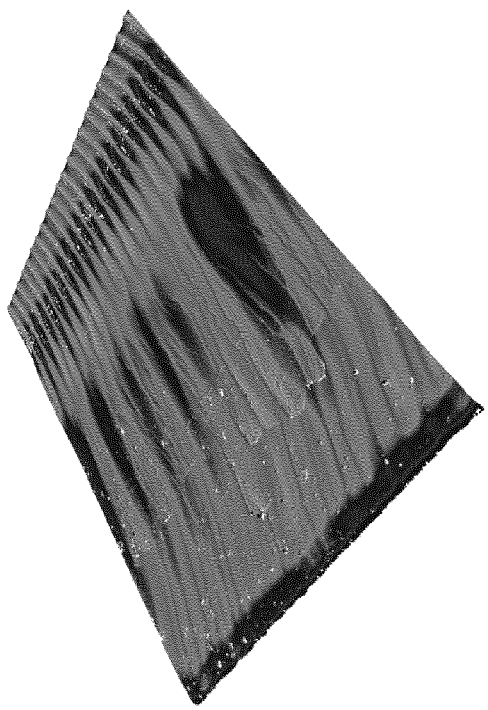

Typically, two different types of cut surface corrugations occur. The corrugations in the top region of the cut surface as shown in FIG. 1 (top right area of the illustrated cut surface of mild steel) result from a periodic melting of the metal by laser radiation and gas jet. It has to be noted with respect to FIGS. 1 and 2 that during cutting treatment the laser beam has been directed from the top corner to the left corner of the illustrated cut surface and that the laser beam has been moved from the lower right corner to the upper left corner of the Figure. When irradiated by the laser beam a part of the workpiece surface is heated until ignition temperature is reached and the reaction of the metal and oxygen gas is started. The reaction front radially broadens and the material of the workpiece is molten until the temperature falls below ignition temperature by which the reaction is stopped. Due to its movement, the laser beam is following the reaction front and the solid surface of the workpiece is again heated until the ignition temperature is reached and the process is repeated. From this cyclic process the periodicity of the corrugations of the cut surface results, representing a first type of corrugation of the cut surface.

Starting from a cutting depth of a few millimeters of the cut surface, a molten film is typically produced which covers the periodic corrugations. After solidifying, the molten film may leave a smooth oxygen layer having broad corrugations (typically more than 0.5 mm thick) and a small amplitude. Laser cutting using subcritical gas flow allows for a laminar flow of the molten material. Thereby, the laser beam which is incident on the molten surface may just heat the molten material such that on the one hand the reaction front lies within the molten material and proceeds as quickly as the moving laser beam, and on the other hand the molten material remains hot enough to stay fluid until leaving the process zone. Thus, a second type of corrugation of the cut surface is formed.

Moreover, in order to enable varying treatment procedures, it is desired to adjust the laser beam as quickly and flexibly as possible. This is typically realized by changing the beam quality or by beam shaping.

U.S. Pat. No. 8,781,269 B2 discloses a method for generating a laser beam with different beam profile characteristics. A laser beam is coupled into one fibre end of a multi-clad fibre. To generate different beam profile characteristics of the output laser beam the input laser beam is electively coupled either into the inner fibre core or into one outer ring core of the multi-clad fibre.

U.S. Pat. No. 9,250,390 B2 is directed to a material laser beam processing system. By varying the input convergence angle and/or launch angle of the laser beam launched into a waveguide, the output spot size can be continuously varied.

U.S. Pat. No. 9,346,126 B2 illustrates beam shaping using a concave lens.

According to EP 2730363 A1 in a laser processing apparatus an optical system is provided with a collimating lens, an axicon lens and a focusing lens, resulting in an annular intensity distribution at the focus region.

EP2762263 A1 discloses a laser cutting with a ring beam having inner and outer diameters that tend to expand after passing through a focus position of a condenser lens.

According to DE 2821883 B1 a laser beam is directed to an axicon which converts the gaussian energy distribution of the laser beam to an annular energy distribution.

DE 102015116033 A1 describes a beam shaping using an axicon positioned with respect to the beam direction in front of a focusing lens.

EP 2778746 B1 describes an optical device for beam formation which has two plate-shaped optical elements whose thickness profiles are inverse to each other.

DE 102015101263 A1 illustrates two plate-shaped optical elements having circular surface patterns including alternating inclined facets.

Object of the invention is to provide a beam shaper, and a device and a method for laser beam treatment of a workpiece, in particular for laser beam cutting, by which a high quality of the treated workpiece can be realized.

This object is achieved by a beam shaper according to claim 1, a device for laser beam treatment of a workpiece according to claim 14, a use according to claim 19, a use according to claim 20, and a method for laser beam treatment of a workpiece according to claim 21.

In a first embodiment, a beam shaper for shaping a laser beam for a device for laser beam treatment, in particular laser beam cutting, is provided, including a first beam shaping section designed for shaping a central part of the laser beam such that the laser beam includes first wave fronts which are at least partially spherical, and a second beam shaping section designed for shaping a peripheral part of the laser beam such that the laser beam includes second wave fronts which are at least partially parallel and at least partially incoherently superimpose the first wave fronts. Due to the at least partially incoherent superposition of the first and the second wave fronts, a substantially homogeneous profile of the intensity distribution of the laser beam perpendicular to its beam direction can be provided by the beam shaper. Further, in the application of metal cutting using a laser cutting device with a beam shaper, the cutting process is favorably stabilized.

According to embodiments, the first beam shaping section may form a central portion of the beam shaper, and the second beam shaping section may form a peripheral portion of the beam shaper. This allows a simple design of the beam shaper.

Moreover, embodiments of the beam shaper can include at least one optical element. According to further embodiments, at least one of the first and the second beam shaping sections can include or can be a focusing optical portion. In addition or alternatively, at least one of the first and the second beam shaping sections can include or may be an aberrational optical portion. Thereby, the laser beam to be produced can be advantageously shaped, tailored and varied, e.g. as desired for specific laser treatments.

In some embodiments, at least one of the first and second beam shaping sections is designed such that the respective part of the shaped laser beam has a divergence change of 5° or less, preferably of 3° or less, more preferably of 1° or less. This allows an advantageous beam shaping promoting a substantially homogeneous profile of the intensity distribution of the laser beam perpendicular to its beam direction.

According to further embodiments, the first beam shaping section may include at least one substantially spherically or substantially aspherically shaped surface, and/or the second beam shaping section may include at least one substantially axiconically shaped surface. Thereby, the first and second beam shaping section can be realized by simple optical elements or structures.

According to other embodiments, the at least one substantially spherically or aspherically shaped surface can be concave or convex. This allows variations of the structure of the beam shaper.

According to some embodiments, the first beam shaping section includes at least one substantially spherically or aspherically shaped surface and the second beam shaping section includes at least one axiconically shaped surface, the spherically or aspherically shaped surface being adjacent to the axiconically shaped surface, wherein a transition from the axiconically shaped surface to the spherically or aspherically shaped surface is continuous. Thereby, the superposition of the first and second wave fronts can be optimized.

According to further embodiments, the beam shaper may be formed of or may include at least partially an axicon having a tip which is at least partially substantially spherical or at least partially substantially aspherical, in particular, an oblate tip axicon. Thereby, a substantially homogenous intensity distribution of the laser beam perpendicular to its propagation direction can be provided using a simple design of the beam shaper.

Moreover, in some embodiments at least one element selected from the first beam shaping section, the second beam shaping section, and the beam shaper can be rotationally symmetric. Thus, circular laser beam spots having circular intensity distributions can be realized.

Further embodiments of the beam shaper can be designed such that a free numerical aperture of the first beam shaping section is 50% or less of a free numerical aperture of the beam shaper. This allows a substantially even distribution of the laser beam power on the first and second beam shaping sections. Free numerical aperture characterizes the range of angles over which the optic transmits over 99% of the laser power.

In other embodiments, the beam shaper may include at least one element selected from a Near Infrared (NIR) effective material and an antireflection coating. Both embodiments promote shaping high power laser beams.

A second embodiment is directed to a device for laser beam treatment of a workpiece, in particular for laser beam cutting, including at least one beam shaper according to the first embodiment. The device for laser beam treatment allows a laser beam treatment of workpieces, in particular of metal sheets having a thickness of more than 15 mm, by which smooth surfaces of treated surfaces, e.g. cut surfaces, can be obtained.

According to some embodiments, the device for laser beam treatment may include a device for changing the laser beam breadth or diameter incident on at least one of the beam shapers. Thereby, the intensity distribution and/or the spot size of the laser beam perpendicular to the beam direction can be changed.

According to embodiments, the device may further include at least one of the following components: a laser source, in particular a source providing a laser beam power of 500 W or more; a processing head in which at least one of the beam shapers is provided; an aperture positioned with respect to the beam direction in front of at least one of the beam shapers; a focusing lens positioned with respect to the beam direction in front of or behind at least one of the beam shapers; a protective window positioned with respect to the beam direction behind at least one of the beam shapers; an adjusting device for adjusting at least one of the beam shapers laterally to the laser beam direction; a positioning device for positioning at least one of the beam shapers within and/or outside the laser beam; and a laser beam treatment plane, in particular a cutting plane, at or behind a laser beam waist of the laser beam. Thereby, a safe laser beam treatment, in a particular cutting treatment, of workpieces having thicknesses of more than 15 mm can be performed while producing smooth cut surfaces. Moreover, treatments of the workpiece can be promoted by using laser spots having substantially homogeneous intensity distributions perpendicular to the beam direction.

According to further embodiments of the device for laser beam treatment, at least one of the beam shapers can be designed to be exchanged individually. In other embodiments of the device for laser beam treatment, at least one of the beam shapers and the protective window can be designed to be exchanged individually or together. Thereby, the beam shaper can be exchanged after use or according to specific treatments as desired, alone or together with the protective window.

A third embodiment relates to a use of a beam shaper according to above first embodiment for laser beam treatment of a workpiece, in particular for laser beam cutting. Thereby, a laser beam treatment can be realized using a laser beam having a substantially homogeneous profile of the intensity distribution perpendicular to its beam direction.

According to a fourth embodiment a use of device according to above second embodiment is provided for laser beam treatment of a workpiece, in particular for laser beam cutting. Thus, laser beam treatments can be performed by which smooth surfaces of treated workpieces, e.g. cut surfaces, may be obtained.

In a fifth embodiment, a method for laser beam treatment of a workpiece, in particular for laser beam cutting, is provided including shaping a laser beam by a beam shaper according to above first embodiment. This allows a laser beam treatment, in particular of metal sheets having a thickness of more than 15 mm, by which smooth surfaces of treated surfaces, e.g. cut surfaces, can be obtained.

According to further embodiments of the method, the laser beam may have a laser beam waist and a beam direction, the method including forming with respect to the beam direction at least behind the laser beam waist, in particular at least behind a waist region, a substantially homogeneous intensity distribution perpendicular to the beam direction. Thereby, treated workpieces of high quality, e.g. having smooth cut surfaces, can be obtained.

Other embodiments of the method may include at least one of the following steps: positioning the beam shaper in the laser beam; adjusting the beam shaper laterally to the laser beam direction; positioning the workpiece with respect to the beam direction at or behind the laser beam waist; forming at the workpiece a laser beam spot having a breadth or diameter of 0.1 to 10 mm, preferably from 0.2 to 8 mm, more preferably from 0.3 to 5 mm, most preferably 0.3 to 0.9 mm; transforming the intensity distribution perpendicular to the beam direction; changing a laser beam breadth or a laser beam diameter incident on the beam shaper; and positioning the beam shaper outside the laser beam. These steps promote treatment of workpieces, in particular forming smooth cut surfaces of workpieces.

Figure 6:
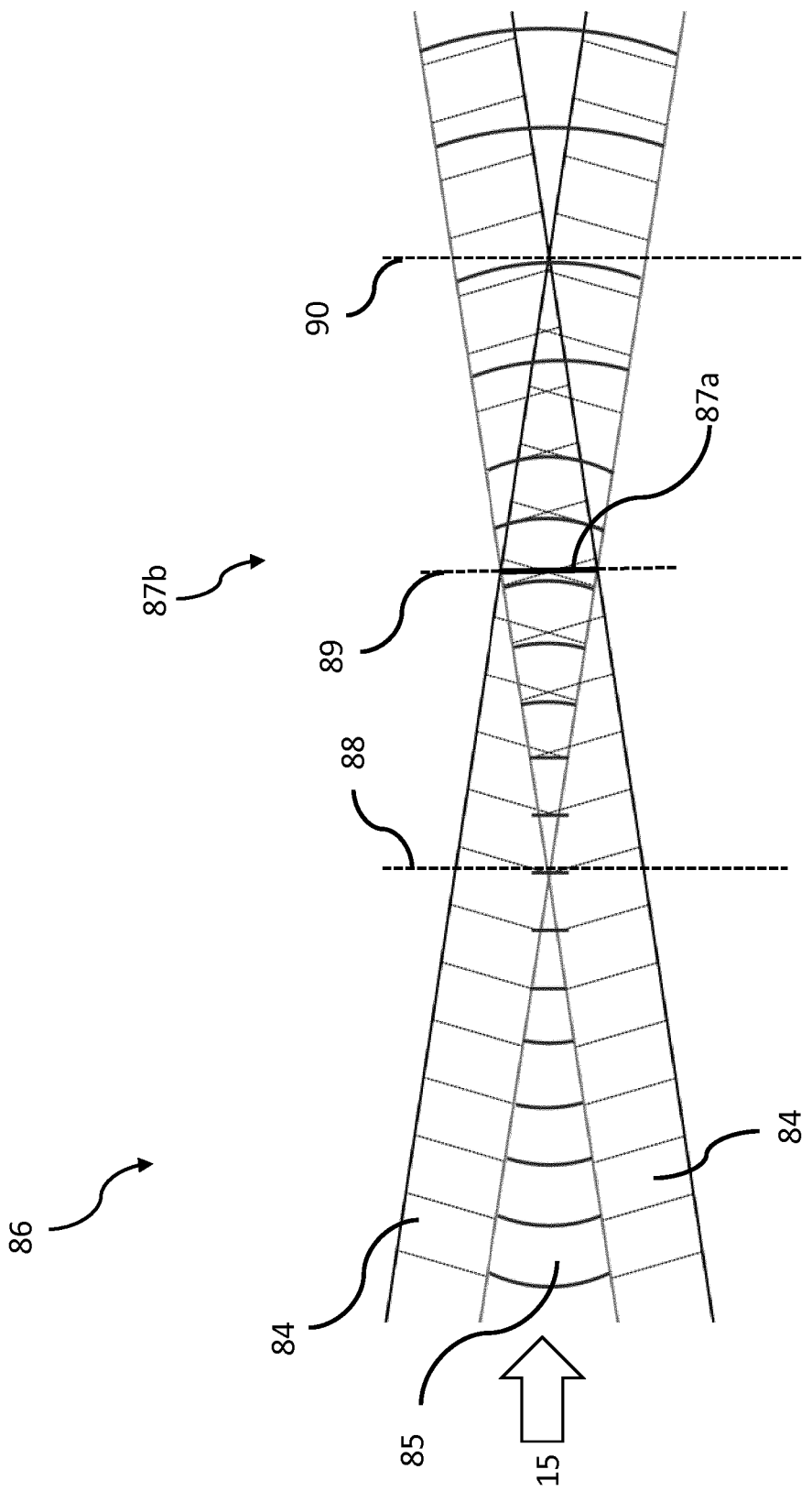

Some of the above mentioned embodiments will be described in more detail in the following description of typical embodiments with reference to the following drawings in which FIG. 1 shows an image of a prior art laser treated surface, the image obtained by a 3D imaging microscope;

FIG. 2 shows an image of a laser treated surface obtained by a device and method according to embodiments of the invention, the image obtained by a 3D imaging microscope;

FIGS. 3a to 3d schematically illustrate cross sectional views of beam shapers according to embodiments of the invention;

FIGS. 4a to 4d schematically illustrate cross sectional views of beam shapers according to embodiments of the invention;

FIG. 5 schematically shows a partial cross sectional view of a device for laser beam treatment according to embodiments of the invention;

FIG. 6 schematically shows a cross sectional view of a laser beam produced using embodiments of the invention;

FIG. 7 shows profiles of laser beam intensity distributions perpendicular to the beam direction of a laser beam produced using embodiments of the invention; and FIG. 8 illustrates cross sectional views of intensities at different magnifications of a laser beam spot produced using embodiments of the invention.

Within the following description of the drawings, the same reference numbers refer to the same components. Generally, only the differences with respect to the individual embodiments are described. The term "beam direction" used in the description may also be understood as "propagation direction" of the laser beam.

In embodiments of the invention, a beam shaper for shaping a laser beam is provided or used, the beam shaper including a first beam shaping section designed for shaping a central part of the laser beam, and a second beam shaping section designed for shaping a peripheral part of the laser beam. Thereby, the central and peripheral parts of the incident laser beam can at least partially be shaped separately from each other.

According to an embodiment, a beam shaper for shaping a laser beam of a device for laser beam treatment, in particular laser beam cutting, includes a first beam shaping section designed for shaping a central part of the laser beam such that the laser beam includes first wave fronts which are at least partially spherical, and a second beam shaping section designed for shaping a peripheral part of the laser beam such that the laser beam includes second wave fronts which are at least partially parallel and at least partially incoherently superimpose the first wave fronts.

The first beam shaping section of embodiments may have a breadth or diameter perpendicular to the laser beam direction in a range of about 3 mm or more, preferably of about 6 mm or more, more preferably of about 8 mm or more In some examples of embodiments, the second wave fronts can induce a Quasi-Bessel beam in their interaction area. Moreover, due to the at least partially incoherent superposition of the first and second wave fronts, the shaped laser beam may at least partially include a Quasi-Bessel beam.

Due to the at least partially incoherent superposition of the first and the second wave fronts, a substantially homogeneous profile of the intensity distribution of the laser beam perpendicular to its beam direction can be formed by the beam shaper. In particular, the laser beam may reflect a top hat energy distribution or top hat intensity distribution, respectively. For instance, the intensity distribution may be a substantially flat uniform intensity distribution having steep edges, which is thus sharply delimited at the boundary of the laser beam. Thereby, the beam shaper of embodiments surprisingly allows a laser beam treatment of workpieces, in particular of metal sheets having a thickness of more than 15 mm, by which smooth surfaces of treated surfaces, e.g. cut surfaces, are obtained. Thus, compared to the corrugated prior art surfaces as shown by the image of FIG. 1, the cut surfaces of workpieces obtained using embodiments of the invention have reduced surface corrugation amplitudes as illustrated by the image of FIG. 2. The images of FIG. 1 and FIG. 2 were obtained by an Alicona Infinite Focus SL 3D microscope using a 5× magnification.

In addition, the beam shaper of embodiments may also be utilized for other applications, like welding or selective laser melting for which a light beam or laser beam having a substantially homogeneous intensity distribution perpendicular to the beam direction is desired, e.g. a substantially flat uniform intensity distribution with steep edges and a sharply delimited boundary.

Figure 3B:
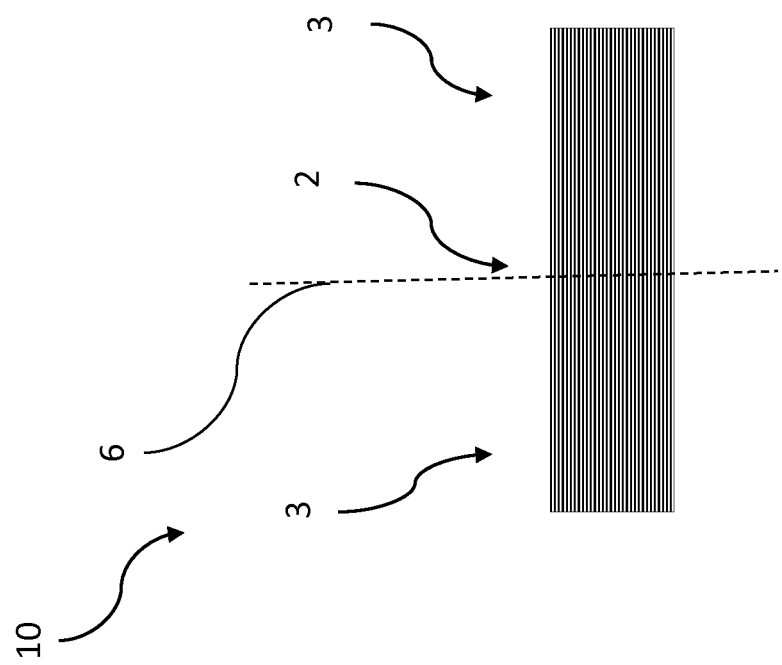
Figure 3A:
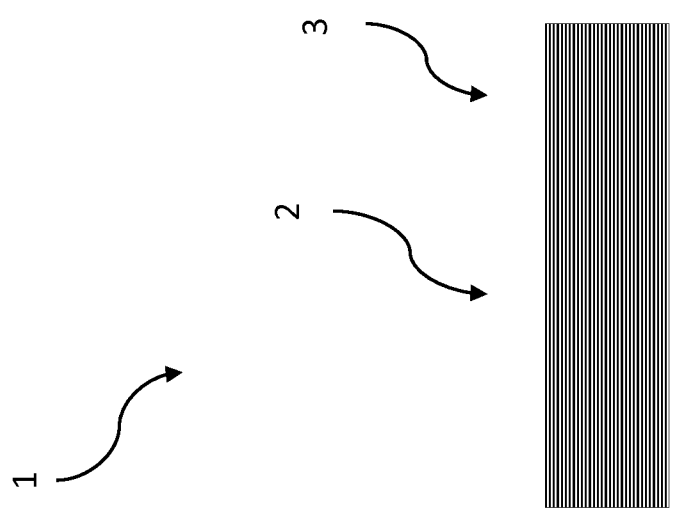
Figure 3C:
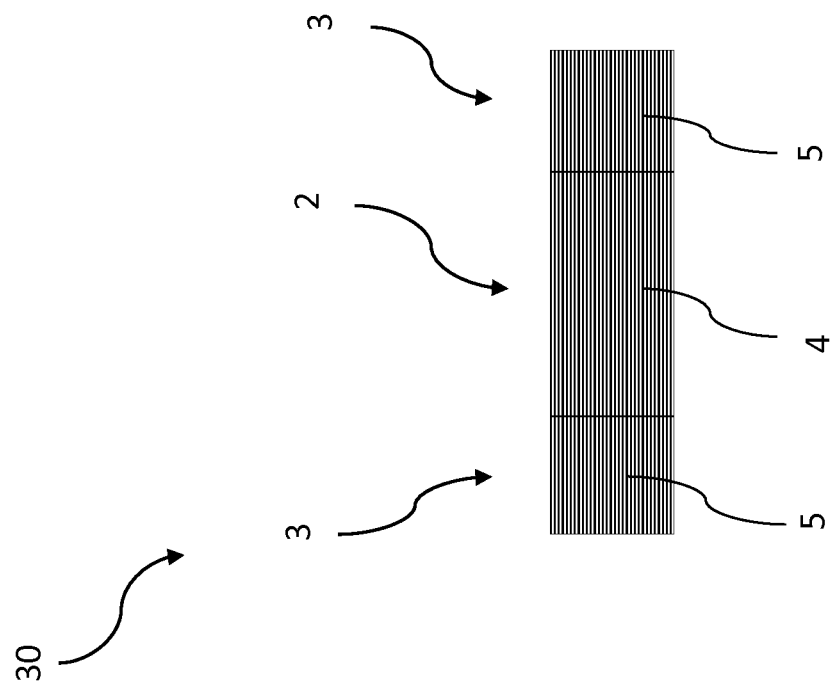
Figure 3D:
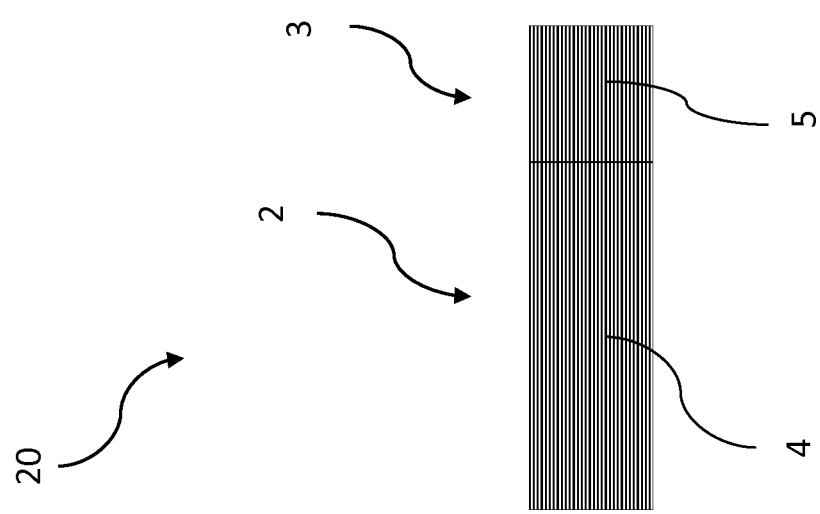

FIG. 3a schematically shows a beam shaper 1 according to above embodiment. The beam shaper has a first beam shaping section 2 and a second beam shaping section 3. According to modifications of embodiments, the beam shaper may include more than one second beam shaping sections 3, e.g. two second beam shaping sections as shown in FIG. 3b. Moreover, the beam shaper may include more than one first beam shaping sections 2, such as shown in FIG. 4c.

According to embodiments, the first and second wave fronts which are effected by the first and second beam shaping sections superimpose each other. Thereby, a laser beam having a laser beam waist may be obtained. Moreover, the second wave fronts may at least partially incoherently superimpose the first wave fronts, in particular with respect to the laser beam direction at least behind the laser beam waist.

In some embodiments, the first beam shaping section forms a central portion of the beam shaper, and/or the second beam shaping section forms a peripheral portion of the beam shaper. Thus, by the central portion of the beam shaper, within the laser beam wave fronts which are at least partially spherical may be effected. Further, by the peripheral portion of the beam shaper, within the laser beam wave fronts which are at least partially parallel may be effected. Moreover, the central portion of the beam shaper may shape the central part of the laser beam and/or the peripheral portion of the beam shaper may shape the peripheral part of the laser beam. This allows a simple design of the beam shaper.

An example of these embodiments is represented by beam shaper 10 of FIG. 3b, wherein the first beam shaping section 2 is arranged centrally while one or more second beam shaping sections 3 are formed at the periphery of the beam shaper, and may enclose or surround the first beam shaping section 3. According to a modification of this example, the beam shaper can include one second beam shaping section 3 which may surround the first beam shaping section 2. In an alternative example, the first beam shaping section 2 can be circular, and the second beam shaping section 3 can be annular and surround the first beam shaping section.

Moreover, the beam shaper may have a central optical axis. During use of the beam shaper the optical axis can be oriented parallel to the laser beam direction. As shown in FIG. 3b, the central optical axis 6 may be positioned centrally to the first and second beam shaping sections 2 and 3. The circular and annular configuration of the first and second beam shaping sections 2 and 3, respectively, can be rotationally symmetric with respect to the optical axis 6.

Furthermore, the beam shaper can include at least one optical element. In particular, the beam shaper may be formed as one optical element including the first and the second beam shaping sections. For instance, the beam shaper can be integrally formed as one unit, e.g. as a unit formed of a refractive material such as $SiO_2$.

Alternatively, the beam shaper may include or may be formed of two or more optical elements. For instance, the first beam shaping section may be formed of or may be part of a first optical element, and the second beam shaping section may be formed of or may be part of a second optical element. The two or more optical elements may be combined by any way of joining optical elements, e.g. by bonding with an optical glue that has a similar refractive index as the optical elements. According to an example illustrated in FIG. 3c, a beam shaper 20 includes two optical elements. The first beam shaping section 2 may be part of a first optical element 4, e.g. a first unit 4 of a refractive material, and the second beam shaping section 3 may be part of a second optical element 5, e.g. a second unit 5 of a refractive material. The first and second optical elements 4 and 5 may be combined to be adjacent to each other. For instance and as shown by beam shaper 30 of FIG. 3d, the first optical element 4 may be a central element and the second optical element 5 may be at least one peripheral element enclosing or surrounding the first optical element 4.

According to further embodiments, at least one of the first and the second beam shaping sections can include or can be a focusing optical portion. In addition or alternatively, at least one of the first and the second beam shaping sections can include or may be an aberrational optical portion. Thereby, the laser beam to be produced can be advantageously shaped, tailored and varied, e.g. as desired for specific laser treatments. Moreover, in case of aberrational designs of the first and/or second beam shaping sections, the central part of the beam shaper may form a central aberrational portion, and/or the peripheral part of the beam shaper may form a peripheral aberrational portion. For instance, the central part of the beam shaper may include at least one central aberrational surface and/or the peripheral part of the beam shaper may include at least one peripheral aberrational surface.

In some embodiments, at least one of the first and second beam shaping sections is designed such that the respective part of the shaped laser beam has a divergence change of 5° or less, preferably of 3° or less, more preferably of 1° or less. For example, the divergence change may be in a range of 0° to 5°, preferably 0° to 3°, more preferably 0° to 1°. The divergence change represents the difference of the laser beam divergence in front of and behind the beam shaper with respect to the beam direction. Further, the divergence change may result from the focusing and/or aberrational designs of at least one of the first and second beam shaping sections. Moreover, in particular embodiments, the divergence changes of both the first and the second beam shaping sections may be similar, in particular substantially identical.

In other embodiments, the first beam shaping section may include at least one substantially spherically or substantially aspherically shaped surface. Alternatively or in addition, the second beam shaping section may include at least one substantially axiconically shaped surface. The at least one substantially spherically or substantially aspherically shaped surface can effect the first wave fronts which are at least partially spherical. The at least one substantially axiconically shaped surface can effect the second wave fronts which are at least partially parallel. This may be due to corresponding refractions of the laser beam running through the respective individual spherically or aspherically and axiconically shaped surfaces of the beam shaper.

Examples of embodiments of beam shapers, wherein the first beam shaping section includes at least one substantially spherically shaped surface and the second beam shaping section includes at least one substantially axiconically shaped surface, are shown in FIGS. 4a, 4c, 4b and 4d, as will be explained below.

It has to be noted that according to the examples of FIGS. 4a to 4d, each beam shaper 40, 50, 60, and 70 may have an optical axis 6 and can have two sides A and B through which the optical axis 6 extends, without being bound by description. During use of the beam shaper, side A can be the side of the beam shaper at which the laser beam is incident. Side A can therefore be called incident side. Side A is shown in FIGS. 4a to 4d as being positioned at the top of the beam shaper. Side B may be opposite to side A of the beam shaper and is shown in FIGS. 4a to 4d as being positioned at the bottom of the beam shaper. In some embodiments, during use of the beam shaper, the laser beam can exit the beam shaper through Side B. Side B can then be called exit side. Moreover, as shown in FIGS. 4a to 4d, at least one first beam shaping section 2 including the at least one spherically shaped surface can be provided at side A and/or at side B of the beam shaper, without being bound by description. Further, as shown in FIGS. 4a to 4d, at least one second beam shaping section 3 including at least one axiconically shaped surface can be provided at side A and/or side B of the beam shaper, again without being bound by description. For example, at least one beam shaping section 3 including at least one axiconically shaped surface may not be provided at side A, but alternatively at side B. Moreover, at least two beam shaping sections 3 could be provided, one at side A and another one at side B of the beam shaper.

According to embodiments, the at least one substantially spherically or aspherically shaped surface of embodiments can be concave or convex.

Examples of convex spherically shaped surfaces are shown in FIGS. 4a and 4c. Therein, each beam shaper 40 and 50 has at side A a central first beam shaping section 2 being formed of one convex spherically shaped surface 12 and having a breadth 22. The spherically shaped surface 12 may be defined by a spherical radius 32.

Examples of concave spherically shaped surfaces are depicted in FIGS. 4c, 4b, and 4d. The beam shapers 50 and 70 shown in FIGS. 4c and 4d each include at side B a first beam shaping section 2 having a concave spherically shaped surface 42. The concave spherical surface 42 may be defined by spherical radius 32. The breadth 22 of the concave spherically shaped surface 42 is shown in FIG. 4c as being smaller than the breadth 22 of the convex spherically shaped surface 12, but may alternatively be equal to the latter or larger. FIG. 4b illustrates an example, wherein at side B of the beam shaper 60 a central first beam shaping section 2 is provided including one concave spherically shaped surface 42 having the breadth 22.

Examples of axiconically shaped surfaces are illustrated by FIGS. 4a, 4c, and 4d. The beam shapers 40, 50, and 70 depicted therein each include at side A at least one second beam shaping section 3 having one axiconically shaped surface 13. The beam shaper 60 of FIG. 4b includes at side B at least one second beam shaping section 3 having one axiconically shaped surface 13. The axiconically shaped surface 13 can be defined by a straight line 23. The straight line 23 may represent the slope of the axiconically shaped surface 13 with respect to a basic line 33 representing the basic plane through the origin of the axiconically shaped surface 23. The straight line 23 and the basic line 33 may enclose the axicon angle 43. The basic line 33 and the basic plane can be perpendicular with respect to the optical axis 6.

In some embodiments of the beam shaper the axicon angle is in a range of 0° to 5°, preferably 0° to 3°, more preferably 0° to 1°. Moreover, embodiments of the beam shaper may include spherically shaped surfaces having a spherical radius 32 of 2000 mm and more, more preferably 1000 mm and more, most preferably 100 mm and more. It should be mentioned that the spherical radius is preferably not below 10 mm. These values are suitable for a refractive index of 1.3 to 2.7. The spherical radius may be dependent on the refractive index of the optical element as explained with reference to equation 2 below. Moreover, the breadth 22 of the spherically shaped surface may be in a range of about 3 mm or more, preferably of about 6 mm or more, more preferably of about 8 mm or more.

According to some embodiments, the first beam shaping section includes at least one substantially spherically or aspherically shaped surface and the second beam shaping section includes at least one axiconically shaped surface, the spherically or aspherically shaped surface being adjacent to the axiconically shaped surface, wherein a transition from the axiconically shaped surface to the spherically or aspherically shaped surface is continuous.

For example, the beam shaper may have at side A a second beam shaping section 3 with a substantially axiconically shaped surface 13 and adjacent thereto a first beam shaping section 2 with a substantially convex spherically shaped surface 12, as shown by the cross sectional illustrations of FIGS. 4a and 4c. In such an embodiment, the requirement of a continuous transition can be fulfilled by defining that the straight line 23 of the axiconically shaped surface 13 corresponds to a tangent of the spherically shaped surface 12 at the transition.

According to further embodiments, the beam shaper may be formed of or may include at least partially an axicon having a tip which is at least partially substantially spherical or at least partially substantially aspherical. In particular embodiments, the beam shaper may be formed of an oblate tip axicon. Cross sectional illustrations of such embodiments may be represented by FIGS. 4a to 4c. In a preferred example of these embodiments, the beam shaper can be formed of an axicon having an oblate tip. The oblate tip can be substantially spherical or substantially aspherical, e.g. as represented by the cross sectional illustrations of FIGS. 4a to 4c.

Moreover, in some embodiments at least one element selected from the first beam shaping section, the second beam shaping section, and the beam shaper can be rotationally symmetric. According to examples of these embodiments, the beam shaper may include the central optical axis 6, and the first and second beam shaping sections 2 and 3, respectively, can be rotationally symmetric with respect to the optical axis 6. Alternatively or in addition, the beam shaper may include the central optical axis 6 and can be rotationally symmetric with respect to the optical axis. For instance, the second beam shaping section 3 can be an annular axicon surface, which is rotationally symmetric with respect to the optical axis 6.

The beam shaper of embodiments can for instance be manufactured by forming an optical element having at least one substantially axiconically shaped surface 13 and/or at least one substantially spherical or aspherical surface 12, 42. For instance, in case that the beam shaper is formed of an axicon having an oblate tip, an axicon may be provided and the tip thereof may be treated, e.g. by grinding, to result in the desired oblate tip, with e.g. a spherical or aspherical shape. Other manufacturing methods known in the art may be applied as well.

As mentioned above, in some embodiments, at least one of the first and second beam shaping sections is designed such that the respective part of the shaped laser beam has a divergence change of 5° or less, preferably of 3° or less, more preferably of 1° or less. According to a preferred design of embodiments of the beam shaper the divergence changes resulting from both the first and the second beam shaping sections may be substantially identical and in addition not larger than 1°. In case of embodiments having at least one spherically or aspherically shaped surface and at least one axiconically shaped surface, the divergence change produced by the axiconically shaped surface can be determined based on the axicon angle γ and the wavelength dependent refractive index η(λ) of the respective material of the beam shaper. In case of a preferred design of embodiments, in which the beam shaper is formed of an axicon having an oblate tip which is substantially spherical, the following may hold: The divergence change resulting from the axiconical part can be expressed as $$\Delta 1_{11} = 1_1(1) - 1_{1 \cdot 1} \tag{1}$$

The divergence change due to the spherical tip can be determined from the diameter δ of the spherical tip, the wavelength dependent refractive index $\eta(\lambda)$ of the respective material, and the effective focal length f of the tip having the radius R $$\frac{1}{f} = l_1(1) - l_1 \cdot \frac{1}{l} \quad (2)$$

The resulting divergence change produced by the spherical tip is $$\Delta l_1 = \frac{1}{1 \cdot 1} \quad (3)$$

Provided that the divergence changes resulting from both the axiconical part and the spherical tip are nearly equal, the following holds $$1 = 2 \cdot 1 \cdot 1, \quad (4)$$

which allows a preferred design of the beam shaper according to embodiments. Alternatively, an equation $$1 = 2 \cdot 1 \cdot \sin(1) \quad (5)$$

describing above preferred design of the beam shaper according to embodiments can be determined based on the above mentioned continuous transition from the axiconically shaped surface to the spherically shaped surface.

In some embodiments of the beam shaper, which include a rotationally symmetric design, the breadth of the first beam shaping section may correspond to the diameter of the first beam shaping section. For instance, in case that the beam shapers of FIGS. 4a to 4d each include a rotationally symmetric first beam shaping section 2, breadth 22 as illustrated in FIGS. 4a to 4d corresponds to the diameter of the first beam shaping section 2.

Further embodiments of the beam shaper can be designed such that a free numerical aperture of the first beam shaping section is 50% or less of a free numerical aperture of the beam shaper. For example, as shown in FIGS. 4a to 4d, the beam shaper 40, 50, 60, 70 has a free numerical aperture 14b that may be in a range of 0.03 to 0.3, preferably 0.075 to 0.15, most preferably 0.09 to 0.12. Further, the first beam shaping section 2 has a free numerical aperture 14a, which in some examples may correspond to the breadth (or diameter) 22 of the first beam shaping section. According to the examples of FIGS. 4a to 4d, the free numerical aperture 14a of the first beam shaping section amounts to about 50% of the free numerical aperture 14b of the beam shaper. Thereby, a preferred beam shaping can be achieved. For instance, in case of a Gaussian intensity distribution of the laser beam incident on the beam shaper, the above requirement of the free numerical aperture of the first beam shaping section, e.g. diameter δ, being 50% or less of the free numerical aperture of the beam shaper allows a substantially even distribution of the laser beam power on the first and second beam shaping sections. Moreover, above requirement allows a preferred intensity distribution perpendicular to the beam direction and with respect to the beam direction at least behind the laser beam waist. Further, in case of aberrational designs of the first and second beam shaping sections, the laser beam power may be evenly distributed between the central aberrational portion and the peripheral aberrational portion.

In other embodiments, the beam shaper may include at least one element selected from a Near Infrared (NIR) effective material and an antireflection coating. For instance, the beam shaper may be formed of a material which is refractive in a wavelength range of 780 nm to 3 μm. Moreover, the beam shaper may include or be formed of a refractive material, such as ZnS, SiO2, or sapphire. In addition or alternatively, the beam shaper may have an antireflection coating based on tantalum oxide, zircon oxide or hafnium oxide and other known coating materials, e.g. at least partially, on its surface.

One embodiment of the invention is directed to a device for laser beam treatment of a workpiece, in particular for laser beam cutting, including at least one beam shaper according to the invention.

FIG. 5 schematically illustrates a partial cross sectional view of a device 80 for laser beam treatment according to an example of embodiments of the invention and of a laser beam produced thereby, propagating towards a workpiece 100, and having a beam direction 15. The device 80 of this example includes a beam shaper 40 as shown in FIG. 4a. The device 80 may be formed as a laser processing head, in particular as a laser cutting head.

The device for laser beam treatment may include at least two different beam shapers according to the invention. This allows adjusting the device for varying beam treatments.

According to some examples, the device for laser beam treatment may include a device for changing the laser beam breadth or diameter incident on at least one of the beam shapers. Thereby, the intensity distribution and/or the spot size of the laser beam perpendicular to the beam direction can be changed. This allows a preferred shaping of the laser beam for treatment of the workpiece, e.g. as desired for varying materials of the workpiece or for varying beam treatments, such as cutting or piercing. FIG. 5 shows a focusing lens 82 as an example of the device for changing the laser beam breadth or diameter incident on beam shaper 40. Alternatively or in addition, an aperture can be provided as a device for changing the laser beam breadth or diameter incident on at least one of the beam shapers. In addition, the device for changing the laser beam breadth or diameter can be used for changing the magnification of the device for laser beam treatment, i.e. the magnification factor for producing the laser beam.

The device for laser beam treatment according to embodiments may further include at least one of the following components: a laser source, in particular a source providing a laser beam power of 500 W or more; a processing head in which at least one of the beam shapers is provided; an aperture positioned with respect to the beam direction in front of at least one of the beam shapers; a focusing lens positioned with respect to the beam direction in front of or behind at least one of the beam shapers; a protective window positioned with respect to the beam direction behind at least one of the beam shapers; an adjusting device for adjusting at least one of the beam shapers laterally to the laser beam direction; a positioning device for positioning at least one of the beam shapers within and/or outside the laser beam; and a laser beam treatment plane, in particular a cutting plane, at or behind a laser beam waist of the laser beam.

The laser source, e.g. a fiberlaser, of embodiments may provide a laser beam power of 500 W or more, preferably of 4000 W or more, and more preferably of 8000 W or more. This is due to the fact that the specific design of the beam shaper according to embodiments allows shaping high power laser beams.

The processing head of embodiments may include not only at least one beam shaper, but also other components of the device for laser beam treatment mentioned herein, such as the aperture, the focusing lens, the protective window, and the adjusting device.

The aperture of some embodiments of the device allows defining the outer boundaries of the incident laser beam. For instance outer boundaries 81 of the laser beam as shown in FIG. 5 can be formed by the aperture. The aperture may define the free numerical aperture of the processing head of the device, which is for instance provided to correspond to the free numerical aperture of the beam shaper.

Some embodiments include the focusing lens as defined above. Other embodiments may not require a focusing lens, for instance in case that a focusing of the laser beam is not necessary, or in case that at least one of the first and the second beam shaping sections of the beam shaper includes a focusing optical portion, as mentioned above. In further embodiments, the focusing lens and/or the first and second beam shaping sections as defined above can be used for changing the magnification of the device for laser beam treatment, e.g. a magnification factor for producing the laser beam.

In examples of the device for laser beam treatment, the protective window positioned with respect to the beam direction behind at least one of the beam shapers shields the beam shaper. Thereby, contamination and/or damage of the beam shaper by material of the workpiece can be avoided during treatment. However, according to some examples, the protective window may not be necessary.

Using the adjusting device of embodiments, the position of the beam shaper may for instance be adjusted laterally, e.g. such that its central optical axis is centrally arranged within the laser beam.

In some embodiments, the positioning device allows to position the beam shaper outside of the laser beam, such that the laser beam can be directed towards the workpiece without being shaped.

Further embodiments of the device for laser beam treatment may include or provide a laser beam treatment plane, in particular a cutting plane, at or behind a laser beam waist of the laser beam. In some examples, the device for laser beam treatment includes a workpiece support for positioning the workpiece, in particular a surface of the workpiece, with respect to the beam direction at the laser beam treatment plane, i.e. at or behind the laser beam waist of the laser beam. These embodiments promote treatments of the workpiece using laser spots having substantially homogeneous intensity distributions perpendicular to the beam direction.

According to further examples of the device for laser beam treatment, at least one of the beam shapers can be designed to be exchanged individually. In other examples of the device for laser beam treatment, at least one of the beam shapers and the protective window can be designed to be exchanged individually or together. Moreover, at least one of the beam shapers and the protective window can form an integral unit.

A further embodiment of the invention is directed to a use of a beam shaper according to any embodiment of the invention for laser beam treatment of a workpiece, in particular for laser beam cutting.

Another embodiment of the invention is a use of a device according to any embodiment of the invention for laser beam treatment of a workpiece, in particular for laser beam cutting.

One embodiment of the invention is directed to a method for laser beam treatment of a workpiece, in particular for laser beam cutting, including shaping a laser beam by a beam shaper according to any embodiment of the invention.

According to the method of further embodiments the laser beam may have a laser beam waist and a beam direction, the method including forming with respect to the beam direction at least behind the laser beam waist, in particular at least behind a waist region, a substantially homogeneous intensity distribution perpendicular to the beam direction.

The waist region of the laser beam may be a region of the laser beam, in which the waist of the laser beam is located. Within the waist region and with respect to the beam direction behind the waist region, the first wave fronts and the second wave fronts can at least partially superimpose each other, e.g. by an at least partially incoherent superposition. Thereby, the substantially homogeneous intensity distribution may be formed at least behind the laser beam waist, in particular at least behind the laser beam waist region. The first wave fronts can be least partially spherical, and the second wave fronts can be at least partially parallel. The waist region of the laser beam may range from a plane perpendicular to the beam direction, in which the focal point of the laser beam rays formed by the first wave fronts is located, to a plane perpendicular to the beam direction, in which the focal point of the outer laser beam rays formed by the second wave fronts is located. The focal point of the rays formed by the first wave fronts may correspond to the focal point of the inner laser beam rays formed by the second wave fronts.

The substantially homogeneous intensity distribution may be a top hat distribution. In some embodiments of the method, the substantially homogeneous intensity distribution and/or the top hat distribution can be formed in a region of the laser beam, having a length of at least 5 mm, preferably at least 10 mm, more preferably at least 20 mm parallel to the beam direction. According to some examples, the first wave fronts may form a circular intensity distribution of the beam and the second wave fronts may form an annular intensity distribution of the beam, which in sum form the top hat distribution which is circular. The radius of the top hat intensity distribution may range from 0.1 to 10 mm, preferably from 0.2 to 8 mm, more preferably from 0.3 to 5 mm, most preferably 0.3 to 0.9 mm, perpendicular to the beam direction. Examples of top hat distributions formed by embodiments of the invention are illustrated in FIG. 7.

The method of further embodiments may include at least one of the following steps: positioning the beam shaper in the laser beam; adjusting the beam shaper laterally to the laser beam direction; positioning the workpiece with respect to the beam direction at or behind the laser beam waist; forming at the workpiece a laser beam spot having a breadth or diameter of 0.1 to 10 mm, preferably from 0.2 to 8 mm, more preferably from 0.3 to 5 mm, most preferably 0.3 to 0.9 mm; transforming the intensity distribution perpendicular to the beam direction; changing a laser beam breadth or a laser beam diameter incident on the beam shaper; and positioning the beam shaper outside the laser beam.

By adjusting the position of the beam shaper laterally to the laser beam direction, the beam shaper may for instance be adjusted such that its central optical axis is centrally arranged within the laser beam.

The step of positioning the workpiece with respect to the beam direction at or behind the laser beam waist allows different workpiece treatments or workpiece treatment steps. Thereby, for instance different breadths or diameters of the laser beam spot, and/or different intensity distributions can be used. This may especially be desired for treating different workpieces, e.g. workpieces of different materials or thicknesses. Other examples are treating different laser treatment sites of the workpiece, e.g. sites having different breadths, diameters or depths, or treating different depth levels of a laser treatment site of the workpiece.

The same holds for the steps of transforming the intensity distribution perpendicular to the beam direction and/or changing a laser beam breadth or a laser beam diameter incident on the beam shaper, each allowing implementation of different workpiece treatments or workpiece treatment steps. In some embodiments, transforming the intensity distribution perpendicular to the beam direction is performed by changing the breadth or diameter of the laser beam incident on the beam shaper.

Moreover, in the method of embodiments the intensity distribution and/or the laser beam spot can be circular.

The step of positioning the beam shaper outside the laser beam allows that the laser beam can be directed towards the workpiece without being shaped.

EXAMPLE

FIG. 5 schematically shows a partial cross sectional view of a device 80 for laser beam treatment according to an example of embodiments of the invention. FIG. 5 also illustrates a laser beam shaped by device 80 and having a beam direction 15 representing the propagation direction. In the present example, device 80 is used as a laser cutting head. However, device 80 may also be used for any other laser treatment.

The device 80 includes the beam shaper 40 according to the embodiments shown FIG. 4*a*. The beam shaper 40 of the present example is rotationally symmetric with respect to optical axis 6. A focusing lens 82 is provided in front of the beam shaper 40 with respect to the laser beam direction 15. Further, with respect to the laser beam direction 15, this example includes a protective window 83 behind the beam shaper 40. However, in embodiments of the invention, the focusing lens 82 and the protective window 83 are optional features. The device 80 includes or provides a laser beam treatment plane or cutting plane 92 at which a surface of the workpiece 100 to be treated is positioned with respect to the beam direction at or behind a waist of the laser beam.

A laser beam having the beam direction 15 and outer boundaries 81 is directed onto the beam shaper 40. The outer boundaries 81 of this example correspond to a numerical aperture 14*c* of a processing head of the device. The laser beam is focused by the focusing lens 82. While running through the beam shaper 40, the laser beam is shaped. This results in an annular laser ray bundle 84 formed by the second beam shaping section 3 including the axiconically shaped surface 13. In addition, a circular laser ray bundle 85 is formed by the central first beam shaping section 2 having the spherical surface 12. Laser ray bundle 84 includes substantially parallel wave fronts. Laser ray bundle 85 includes substantially spherical wave fronts. Due to the shaping of the laser beam, the propagating annular and circular laser ray bundles 84 and 85 superimpose each other within at least a region 86 around the waist of the laser beam.

FIG. 6 schematically depicts region 86 in more detail. The laser beam propagates along beam direction 15, and is shaped to include a waist 87*a* and a waist region 87*b*. Waist 87*a* is positioned at a plane represented by dashed line 89 and reflects the smallest diameter of the laser beam. Waist region 87*b* ranges from a plane represented by dashed line 88 to a plane represented by dashed line 90. In the plane represented by dashed line 88, the focal point of the laser beam rays formed by ray bundle 85 is located. In the plane represented by dashed line 90, the focal point of the outer laser beam rays of ray bundle 84 is located. According to the present example, the focal point of ray bundle 85 corresponds to the focal point of the inner laser beam rays of ray bundle 84.

With respect to the beam direction in front of the waist region 87*b* (in FIG. 6 on the left of line 88), the annular laser ray bundle 84, which is formed by axiconically shaped surface 13 from the peripheral part of the laser beam incident on the beam shaper 40, surrounds circular laser ray bundle 85, which is formed by spherically shaped surface 12 from the central part of the laser beam incident on the beam shaper 40.

Annular ray bundle 84 propagates through waist region 87*b*, such that the plane waves are maintained. Thus, up to dashed line 90, the laser beam includes a Quasi-Bessel beam. Up to plane 89, the annular ray bundle 84 is converging. At plane 89, the inner ray boundary of bundle 84 in front of the waist 87*a* is transformed to the outer ray boundary of bundle 84 behind the waist. Therefore, with respect to the propagation direction behind dashed line 89 and waist 87*a*, the laser ray bundle 84 is transformed into a diverging annular ray bundle. Moreover, at waist 87*a*, the inner ray boundary of bundle 84 in front of the waist region 87*b* is transformed to be positioned at the outer ray boundary of the whole laser beam behind waist 87*a* and behind waist region 87*b* with respect to the beam direction.

At the beginning of waist region 87*b*, i.e. at dashed line 88, more specific at the focal point of the substantially spherically wave fronts of laser ray bundle 85, a point reflection of the substantially spherically wave fronts occurs. Thereby, behind its focal point the circular laser ray bundle 85 is transformed into a diverging circular ray bundle having an outer ray boundary corresponding to the outer ray boundary of the whole laser beam.

As a result, with respect to the beam direction within and behind the waist region 87*b*, i.e. starting at dashed line 88, the two laser ray bundles 84 and 85 substantially incoherently superimpose each other.

Thereby, within and behind the waist region 87*b* of the laser beam, in different planes perpendicular to the beam direction, different intensity distributions measured with a spot monitor from PRIMES as shown in FIG. 7, as well as different spot diameters as shown in FIG. 8 are formed. FIG. 8 shows measured annular intensity distributions and correspondingly calculated beam spots at different laser beam length positions, plane 90 of the laser beam representing length position 0, i.e. at a length of 0 mm. The upper and lower rows of FIG. 8 reflect the spots at laser beam magnifications 2.1 and 1.5, respectively, of device 80.

In plane 89, i.e. at waist 87*a* of the laser beam, an intensity distribution having a sharp peak is formed, as shown in FIG. 7*a*, corresponding to a substantially narrow laser beam spot illustrated in FIG. 8 at length position −3 (i.e. −3 mm).

In propagation direction starting from plane 89, i.e. starting from waist 87*a* of the laser beam, the intensity distributions and the spot diameters are broadened, as depicted in FIGS. 7 and 8, respectively. As visible from FIG. 7*b* and from FIG. 8 at length position 0, showing the intensity distribution and the laser spot formed in plane 90 of the laser beam, the intensity distribution and the laser spot each have a radius which is larger as compared to the ones formed in plane 89 at waist 87*a*. Further, at least from length position 0 (i.e. 0 mm) on, a substantially flat uniform intensity distribution having steep edges is formed. This trend is continued in propagation direction of the laser beam, as can be taken from FIGS. 7*c* to 7*f* and length positions 3 to 12 (3 to 12 mm according to the present example) of FIG. 8.

Thus, in propagation direction behind waist 87a, in particular at least behind waist region 87b, a substantially flat uniform intensity distribution having steep edges, i.e. a top hat intensity distribution of the laser beam, is formed, even at large distances from waist 87a.

Moreover, as shown by FIG. 8, in the present example starting from a magnification of 1.5, increasing the magnification to 2.1 results in shifting intensity from an outer annular distribution into a central circular distribution.

Using the device according to the present example with a beam shaper according to FIG. 4a, a laser beam with a beam parameter product in the range of 3 to 4 and a power in the range of 5000 W to 8000 W was imaged by one focusing lens with a focal length of 64.1 mm in a magnification setting of 2.3 onto a workpiece 100 of mild steel, 20 mm SSAB Laser 250C, for laser cutting.

The device was used with a distance between fiber and lens of 96 mm, a distance between fiber and beam shaper of 129.5 mm, a distance between fiber and protection glass of 131.6 mm and a distance between lens and workpiece of 222 mm.

The beam shaper was formed of fused silica with a refractive index of about 1.45. The beam shaper had an axicon angle of about 0.344°, a spherically shaped surface with a radius of about 667 mm±10 mm and breadth of the first beam shaping section of about 8 mm.

At the beginning of the laser cutting treatment, the untreated surface of the workpiece 100 was positioned at cutting plane 92 of the device, the cutting plane of the present example corresponding to a plane perpendicular to the beam direction behind the laser beam waist 87a, as shown in FIG. 5. The laser beam was directed onto the workpiece with a cutting speed of 1100 mm/min.

Compared to the corrugated cut surface obtained using a prior art laser cutting device as shown by FIG. 1, the cut surface formed by the present example has a reduced surface corrugation amplitude as illustrated by the image of FIG. 2. FIGS. 1 and 2 were both obtained by an Alicona Infinite Focus SL 3D microscope using a 5× magnification.

CONCLUSION

The beam shaper of embodiments according to the invention allows forming a laser beam having a beam shape perpendicular to its propagation direction, i.e. beam spots, and/or an intensity distribution perpendicular to its propagation direction, which may result in energy and heat transfer within a sharply delimited region of the workpiece. For instance, the intensity distribution may be substantially homogeneous perpendicular to the beam direction, e.g. a substantially flat uniform intensity distribution. In addition, the intensity distribution can have steep edges, which thus may be sharply delimited at the outer boundary of the laser beam. In some examples, the laser beam can have circular beam spots and circular intensity distributions perpendicular to its propagation direction. By some embodiments, a top hat energy distribution of the laser beam may be achieved. Moreover, the propagating laser beam can reflect such advantageous shapes and intensity distributions at different laser beam length positions, e.g. at beam spots behind the waist in propagation direction and positioned at large distances from the waist of the laser beam. Thereby, using beam spots behind the laser beam waist, for instance as the cutting depth increases during cutting, the heat transfer per surface unit of the molten material can be reduced, resulting in high quality cut surfaces having reduced surface corrugations, in particular along the whole depth of the cut surfaces.

Using some embodiments of the invention, the advantageous beam shape can be realized by a beam shaper formed of one unit, which for instance may be integrally formed, e.g. including at least one optical element. In case of a beam shaper of embodiments having at least one spherically or aspherically shaped surface and/or at least one axiconically shaped surface, the surface transition(s) can be continuous. An antireflection coating can be easily applied on the beam shaper of embodiments. This is one of the reasons, why the beam shaper according to embodiments of the invention can also be used for shaping high power laser beams.

According to embodiments, an ignition interface can be produced by which periodic surface corrugations having small amplitudes can be formed, which after a few mm of the cut surface, e.g. from depth levels of about 2 to 3 mm of the cut surface on, are covered by a molten film. In embodiments, the ignition interface represents an interface or a transition zone separating the region of combustion reactions from the fluid or solid material of the workpiece. Moreover, the ignition interface provided by embodiments is large enough to provide cut kerfs allowing a sufficient mass stream of active or inert gas, such as oxygen or nitrogen, into the process area. In addition, by some embodiments a circular energy input or energy flow into the uppermost edge of the workpiece and below can be provided, thereby allowing a circular ignition interface having a radius between 0.1 to 10 mm, e.g. 0.1 to 5 mm, preferably from 0.2 to 8 mm, more preferably from 0.3 to 5 mm, most preferably 0.3 to 0.9 mm. In some examples, the radius of the circular ignition interface may be in a range of 0.1 to 1 mm for workpieces having a thickness of 30 mm. Moreover, according to embodiments, due to the advantageous beam shape and ignition interface which may be provided, an energy flow of at least 800 kW/cm2 at the uppermost edge of the workpiece can be realized. In addition, outside the ignition interface the energy flow can be kept at a minimum, e.g. at about 0 kW/cm2.

Moreover, embodiments of the invention allow in case of laser cutting thick workpieces, that the formation of hot spots and of pronounced surface corrugations can be avoided, even at deeper levels of the cut surface. This is due to the advantageous beam shaping, resulting in a laser beam which may diverge already at levels of a few mm, e.g. about 2 to 3 mm, of the cut surface. Thereby, from depth levels of about 2 to 3 mm of the cut surface on, the shaped laser beam can effect an energy flow and a heat input which are below the one effected at the uppermost edge of the workpiece. Thus, the beam shaping of embodiments allows a stabilization of the ignition dynamics and process stability.

LIST OF REFERENCE SIGNS

1 beam shaper
2 first beam shaping section
3 second beam shaping section
4 first optical element
5 second optical element
6 optical axis
10 beam shaper
12 spherically or aspherically shaped surface
13 axiconically shaped surface
14a free numerical aperture of first beam shaping section
14b free numerical aperture of beam shaper
14c numerical aperture of a processing head of the device
20 beam shaper
22 breadth or diameter
23 straight line 30 beam shaper
32 spherical radius
33 basic line
40 beam shaper
42 spherically or aspherically shaped surface
43 axicon angle
50 beam shaper
60 beam shaper
70 beam shaper
80 device for laser beam treatment
81 outer boundaries of the laser beam
82 focusing lens
83 protective window
84 laser ray bundle
85 laser ray bundle
86 region
87a laser beam waist
87b laser beam waist region
88 dashed line
89 dashed line
90 dashed line
92 laser beam treatment plane
100 workpiece

The invention claimed is:

1. A beam shaper for shaping a laser beam for a device for laser beam treatment, the laser beam treatment including laser beam cutting, the beam shaper comprising:
an optical element comprising:
an incident side upon which the laser beam is incident;
an exit side from which the laser beam exists following passing through the beam shaper;
a first beam shaping section designed for shaping a central part of the laser beam for laser beam cutting such that the laser beam includes first wave fronts which are at least partially spherical, and
a second beam shaping section designed for shaping a peripheral part of the laser beam for laser beam cutting such that the laser beam includes second wave fronts wherein, in a cross-sectional view, wave fronts within a portion of the second wave fronts parallel with one another, and, upon propagation to a focus, the second wave fronts at least partially incoherently superimpose the first wave fronts, the combination of the first beam shaping section and the second beam shaping section generates a top hat intensity distribution of the laser beam perpendicular to a direction of the laser beam for laser cutting existing the exit side;
wherein the incident side of the beam shaper further comprises at least one of the following:
the first beam shaping section includes at least one spherically or aspherically shaped surface,
the second beam shaping section includes at least one axiconically shaped surface having a shape of a peripheral part of an axicon, and
the beam shaper is formed of or includes at least partially an axicon having a tip which is at least partially spherical or at least partially aspherical.

2. The beam shaper according to claim 1,
wherein the first beam shaping section forms a central portion of the beam shaper, and the second beam shaping section forms a peripheral portion of the beam shaper.

3. The beam shaper according to claim 1,
wherein the beam shaper includes at least one optical element.

4. The beam shaper according to claim 1,
wherein at least one of the first and second beam shaping sections is designed such that the respective part of the shaped laser beam has a divergence change of 5° or less.

5. The beam shaper according to claim 1, wherein the spherically or aspherically shaped surface is concave or convex.

6. The beam shaper according to claim 1,
wherein the first beam shaping section includes at least one spherically or aspherically shaped surface and the second beam shaping section includes at least one axiconically shaped surface, the at least one spherically or aspherically shaped surface being adjacent to the at least one axiconically shaped surface, wherein a transition from the at least one axiconically shaped surface to the at least one spherically or aspherically shaped surface is continuous.

7. The beam shaper according to claim 1, wherein the beam shaper is formed of an oblate tip axicon.

8. The beam shaper according to claim 1, wherein at least one element selected from the first beam shaping section, the second beam shaping section, and the beam shaper is rotationally symmetric.

9. The beam shaper according to claim 1,
wherein the beam shaper is designed such that a free numerical aperture of the first beam shaping section is 50% or less of a free numerical aperture of the beam shaper.

10. The beam shaper according to claim 1,
further comprising at least one element selected from a Near Infrared (NIR) effective material and an antireflection coating.

11. The beam shaper according to claim 1,
wherein at least one of the first and second beam shaping sections is designed such that the respective part of the shaped laser beam has a divergence change of 3° or less.

12. The beam shaper according to claim 1,
wherein at least one of the first and second beam shaping sections is designed such that the respective part of the shaped laser beam has a divergence change of 1° or less.

13. A device for laser beam treatment of a workpiece including laser beam cutting, comprising at least one beam shaper according to claim 1.

14. The device according to claim 13, further comprising a device for changing the laser beam breadth or diameter incident on at least one of the beam shapers.

15. The device according to any of claim 13,
wherein at least one of the beam shapers is designed to be exchanged individually.

16. The device according to claim 13,
wherein at least one of the beam shapers and the protective window are designed to be exchanged individually or together.

* * * * *